Aug. 30, 1955  R. T. DAVIES  2,716,568
ELECTRICALLY CONTROLLED VEHICLE DOOR LOCK
Filed Aug. 7, 1953  2 Sheets-Sheet 1
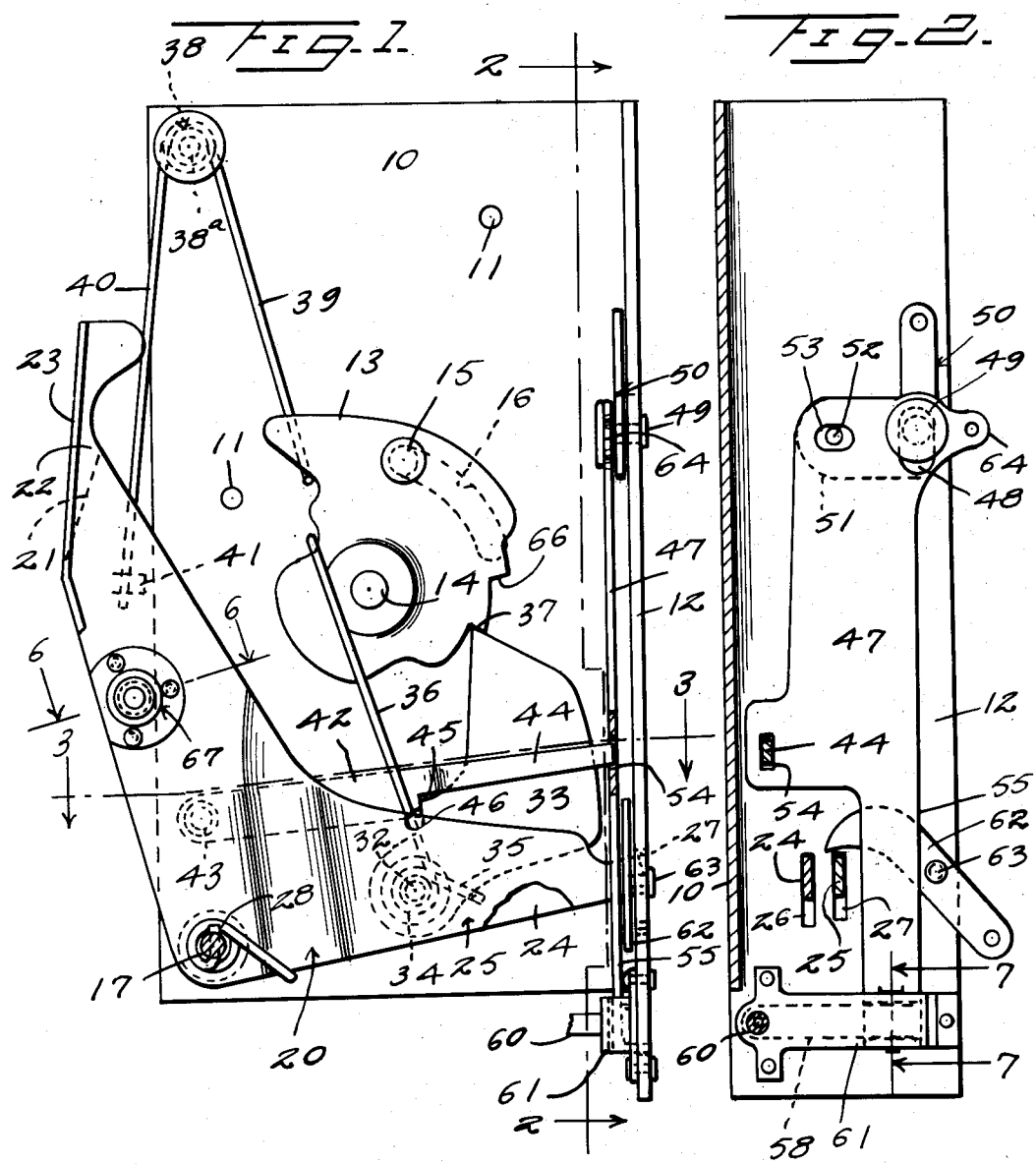
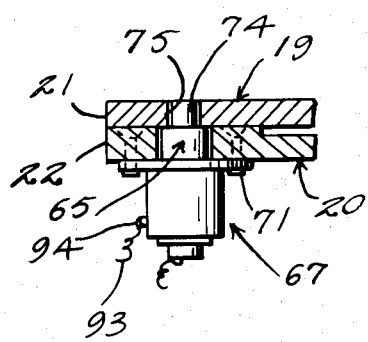
INVENTOR
R.T. Davies
BY John N. Randolph
ATTORNEY

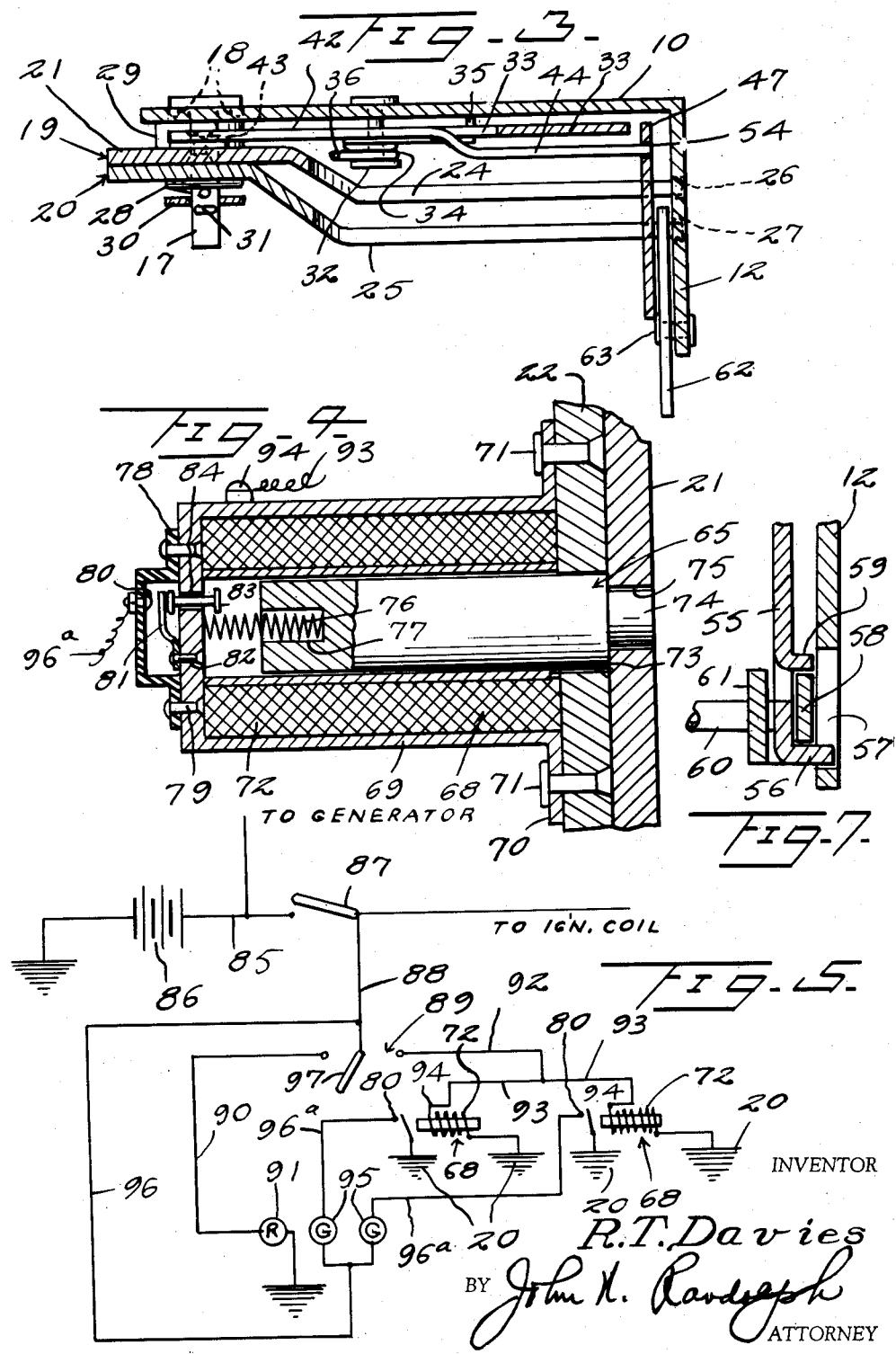

United States Patent Office 2,716,568
Patented Aug. 30, 1955

2,716,568

ELECTRICALLY CONTROLLED VEHICLE DOOR LOCK

Richard T. Davies, Catasauqua, Pa.

Application August 7, 1953, Serial No. 372,967

8 Claims. (Cl. 292—229)

This invention relates to an electrically operated locking means for use with a conventional door lock and latch structure of an automobile door for electrically locking the door to prevent opening thereof from either the inside or outside of the vehicle.

A primary object of the present invention is to provide an electrically operated locking mechanism primarily adapted to prevent children from opening automobile doors while the vehicle is in motion but which will also function effectively to prevent an intruder from opening the vehicle door, either from the inside or outside, while the vehicle is stopped for a traffic light, et cetera.

More particularly, it is an aim of the present invention to provide an electrically operated lock of extremely simple construction capable of being readily applied to conventional vehicle door lock or latch mechanisms either at the time of manufacture or after installation in a vehicle door.

Another object of the invention is to provide an electrically operated lock which readily adapts itself to be used in groups electrically connected in parallel in a single wire type circuit and wherein all of the locking units of the different doors of an automobile are controlled by a single switch.

A further object of the invention is to provide an electrically operated vehicle door locking system wherein tell-tale lights may be interposed in the electric circuit of the group of locking units for visually indicating when the locking units are in operation and are not in operation.

Various other objects and advantages of the invention will hereinafter become more fully apparent from the following description of the drawings, illustrating a presently preferred embodiment thereof, and wherein:

Figure 1 is a side elevational view of a substantially conventional vehicle door locking and latching mechanism equipped with an electrically operated lock;

Figure 2 is a sectional view thereof, partly in elevation, taken substantially along a plane as indicated by the line 2—2 of Figure 1;

Figure 3 is a somewhat enlarged sectional view taken substantially along a plane as indicated by the line 3—3 of Figure 1;

Figure 4 is an enlarged longitudinal sectional view of the electrically operated lock constituting the invention and shown in an applied position;

Figure 5 is a diagrammatic view of one preferred form of the electric circuit for the electrically operated lock and showing two of the locks interposed in the circuit;

Figure 6 is an enlarged fragmentary sectional view taken substantially along a plane as indicated by the line 6—6 of Figure 1, and Figure 7 is an enlarged sectional view taken substantially along a plane as indicated by the line 7—7 of Figure 2.

Referring more specifically to the drawings, a door locking and latching mechanism for a motor vehicle door is illustrated and includes a plate 10 which is adapted to be disposed along the free edge of an automobile door and to be secured therein by fastenings, not shown, which extend through the openings 11. The plate 10 is provided with a flange 12 projecting at substantially a right angle from one longitudinal edge thereof and which is adapted to be disposed adjacent the inner side of the door and which extends inwardly from the plate 10, with respect to the door, not shown. A latch bolt carrying element 13 is turnably mounted on the inner side of the plate 10 on a pivot 14, which is suitably anchored to said plate. The element 13 has one end of a latch bolt 15 anchored therein at a point radially spaced from the pivot 14. The bolt 15 extends outwardly through an arcuate slot 16 of the plate 10 and said bolt is adapted to engage a conventional keeper, not shown, mounted in the door jamb.

A headed pivot pin 17 extends through the plate 10 adjacent its bottom edge and remote to the flange 12 and said pivot pin is keyed to the plate 10 by studs 18 which extend from the head of the pivot pin into recesses of the plate 10. The pivot pin 17 extends from the plate in the same direction as the flange 12. A pair of substantially L-shaped levers 19 and 20 are journalled on the pin 17 adjacent the apexes thereof. The levers 19 and 20 have upwardly extending ends 21 and 22, respectively. The outer lever 20 has a flange 23 which extends outwardly from the lever end 22, for a purpose hereinafter to be described. The other lower legs 24 and 25 of the levers 19 and 20, respectively, are offset in directions away from the plate 10, adjacent the pivot 17 and extend from the pivot toward the flange 12. The distal ends of the lever arms 24 and 25 are reduced in width and extend into elongated slots 26 and 27 of the flange 12, which are longer than said distal lever ends, as seen in Figure 2. A spring 28 is wound on the outer portion of the pivot pin 17 and has one end anchored in said pivot pin and an opposite inturned end bearing under the lever arm 25 for urging the lever 20 only to swing counterclockwise on the pivot 17 to normally maintain the distal end of the lever arm 25 in engagement with the upper end of the slot 27, which slot limits swinging movement of said lever 20. The levers 19 and 20 are held spaced from the plate 10 by a spacing element 29 which is mounted on the pivot pin 17 and disposed between the inner lever 19 and the plate 10. A washer 30 and cotter pin 31 are mounted on the pivot pin 17 outwardly of the spring 28 to retain the levers 19 and 20 against outward displacement.

A headed pivot pin 32 is mounted in the plate 10. A pawl 33 is pivotally mounted adjacent one end thereof on the pivot pin 32 and is disposed adjacent the plate 10 and between said plate and the inner lever 19. A spring 34 is wound on the pivot pin 32 and has one end 35 engaging under a bottom edge of the pawl 33 for urging said pawl to swing counterclockwise toward the latch element 13, as seen in Figure 1. The other leg 36 of the spring 34 engages a recess of the latch bolt supporting element 13 above the pivot 14 to urge said element and the latch bolt 15 to swing clockwise. The spring leg 35 normally retains the free end of the pawl 33 in engagement with a shoulder 37 of the latch bolt supporting element 13 for retaining said element 13 against clockwise rotation under the biasing action of the spring leg 36. A spring 38 is supported intermediate of its ends on a pin 38a which projects from the upper portion of the plate 10, said spring having an intermediate portion wound on the pin 38a and being provided with depending leg portions 39 and 40 which are biased in opposite directions. The lower end of the spring leg 39 engages an upper portion of the element 13 to cooperate with the spring leg 36 for rotating said element 13 in a clockwise direction as seen in Figure 1. The lower end of the spring leg 40 engages a struck-out tongue 41 of the upper lever arm 21 to urge the inner lever 19 to turn counterclockwise as seen in Figure 1 about the pivot 17, and counterclockwise of the lever 20. The extent of this counterclockwise swinging movement of the lever 19 is limited by the distal end of the lower lever arm 24 engaging the upper end of the slot 26. Thus, the two levers 19 and 20 are both independently spring urged to swing counterclockwise on the pivot 17.

A bar 42 is pivotally connected at one end thereof by a pivot pin 43 to the upper lever arm 21 above the pivot 17, said bar 42 being disposed between the inner lever 19 and the plate 10, as best illustrated in Figure 3. The bar 42 extends from the pivot 43 toward the flange 12 and has a free end 44 which is offset outwardly from the plate 10 and from the pawl 33. The inner end of the bar 42 is disposed substantially coplanar with the pawl 33 and is provided with a shoulder 45 located adjacent the inner end of the offset bar portion 44 and which abuts against or is disposed to abut a shoulder 46 of the pawl 33.

The parts previously described are all conventional in a vehicle door locking and latching mechanism except that the inner lever 19 is added and the bar 42 which is conventionally pivoted to the single lever 20 is pivotally connected to the added inner lever 19. Additionally, the spring 28 is added to turn the outer lever 20 counterclockwise, whereas in the conventional lock, the single lever 20 is actuated by the spring leg 40.

The conventional parts of the door lock and latch mechanism also includes the elements as illustrated in Figure 2. These include a hanger bar 47 having a vertically elongated slot 48 at the upper end thereof which loosely engages the shank of a headed pin 49 which is fixed to and projects from the inner side of the flange 12. A lever 50 is pivotally mounted on the pin 49 and includes a laterally projecting arm 51 from which projects a pivot pin 52. Pivot pin 52 extends loosely through an opening 53 of the bar 47 which is laterally spaced from the slot 48. The bar 47 is provided with a slot 54, which is disposed substantially below the opening 53, in which the distal end of the bar portion 44 is disposed, as seen in Figures 1 and 2. The bar 47 has a lower end 55 of restricted width provided with an outturned terminal portion 56, as seen in Figure 7, which engages a longitudinally elongated slot 57 of the flange 12. A lever 58 extends transversely across the bottom portion on the inner side of the flange 12 and has a free end disposed on the inner side of the bar portion 55 between the outturned end 56 thereof and an outturned struck-out tongue 59. The other end of the lever 58 is fixed to an elongated actuator element 60 between portions thereof which are journalled in the flange 12 and in a cover plate 61 which is disposed over the lever 58 and secured to said flange 12. The other end of the actuator 60, not shown, which is disposed adjacent the left hand edge of the plate 10, as seen in Figure 1, is connected to suitable key actuated means which is operated by a key inserted into the vehicle door from the outer side thereof for turning the actuator element 60 and lever 58 counterclockwise as seen in Figure 2. A pawl 62 is pivotally mounted intermediate of its ends at 63 on the inner side of the flange 12 and has an inner end which engages over the upper edge of the distal end of the lever arm 25 only. The other end of the pawl 62 is adapted to be suitably connected in a conventional manner to a door handle disposed on the inner side of the door and which is actuated to rock the pawl 62 counterclockwise as seen in Figure 2. The lever 50 is provided with an outwardly extending arm 64 which is adapted to be connected by a suitable linkage to the conventional push button lock on the inner side of a door for rocking the lever 50 clockwise as seen in Figure 2.

The conventional operation of the parts as illustrated in Figures 2 and 7 and just previously described will be briefly described to afford a better understanding of the invention. Assuming that the lever arms 21 and 22 are connected by the element 65, as illustrated in Figure 6, when the pawl 62 is rocked counterclockwise as seen in Figure 2, the lever 20 will be rocked clockwise on its pivot 17, as seen in Figure 1 and the lever 19 will be rocked in the same direction due to the connection of the levers 19 and 20 by the element 65. This will cause the bar 42 to be displaced from left to right of Figure 1 and in so moving its shoulder 45 by engagement with the shoulder 46 of pawl 33 will swing the pawl out of engagement with the shoulder 37 of element 13 and sufficiently to clear the intermediate stop shoulder 66, allowing the spring arms 36 and 39 to turn the element 13 and the latch bolt 15 clockwise about the pivot 14 until the bolt 15 engages the lower end of the slot 16.

The latch bolt 15 is thus released to permit opening of the door from the inside by the conventional handle and is held in this released position by the spring arms 36 and 39 until the door is again closed, at which time the bolt 15 is cammed back to its position of Figure 1 in a conventional manner by the latch keeper, causing the bolt carrying element 13 to swing counterclockwise on its pivot 14. Further, the levers 19 and 20 are returned to their positions of Figure 1 by the spring 28 and spring arm 40 as soon as pressure on the pawl 62 is released. When the lever 50 is rocked clockwise as seen in Figure 2 by the push button lock, the pin 52 swings upwardly lifting the bar 47 and causing the bar 42 to be swung upwardly so that its shoulder 45 is disposed above the pawl shoulder 46, thus locking the door from the inside so that clockwise swinging movement of the levers 19 and 20, as seen in Figure 1, will not cause the pawl 33 to swing out of engagement with the shoulder 37. This same locking of the mechanism may be accomplished by the key inserted from the exterior of the door for turning the element 60 and the lever 58 in a counterclockwise direction as seen in Figure 2, and which has the same effect in lifting the bar 42, as just previously described. The push button or other exterior latch actuator of the door engages the flange 23 so that when the outside door actuator is operated a pressure is exerted against the flange 23 to swing the levers 19 and 20 clockwise as seen in Figure 1 for moving the bolt 15 to an unlatched position, as previously described. The foregoing description of the operation and locking of the mechanism is conventional.

An electrically operated lock, designated generally 67 and of which the element 65 forms a part, is best illustrated in Figures 4, 5 and 6, and includes an electromagnet, designated generally 68. The electromagnet 68 includes a casing 69 an inner end of which is provided with an outturned flange 70 which is secured by fastenings 71 to the outer side of the lever arm 22. The casing 69 contains the winding 72 of the electromagnet which is disposed around the core of the electromagnet which constitutes the connecting element 65, previously referred to, an outer portion of which normally extends into an opening 73 of the lever arm 22. Said outer portion of the core 65 has a restricted terminal 74 extending therefrom which engages in an opening 75 of the lever arm 21 for connecting the levers 19 and 20. The core 65 is normally held in an extended position by a push spring 76 one end of which bears against the outer end of the casing 69 and the other end of which seats in a socket 77 in the inner end of the core 65. A housing 78 of electrical insulating material is secured by fastenings 79 to the outer end of the housing 69 and provides an electrically insulated support for a switch post 80 which is disposed on the inner side of the housing 78 in outwardly spaced relationship to the outer end of the housing 69. A leaf spring contact 81 of electrical conducting material is secured at one end by a fastening 82 to the outer end of the housing 69 and has a free end supported in the housing 78 in normally spaced relationship to the contact 80, so that the contacts 80 and 81 form a normally open switch. A double headed plunger or push rod 83 has a shank portion extending loosely through an opening 84 of the outer end of the housing 69 and is of sufficient length to slidably engage said opening, as seen in Figure 4.

Referring to Figure 5, one preferred electric circuit for operation of any desired number of the electromagnets 68 is illustrated and which includes a conductor 85 leading from the positive terminal of a grounded electric current source 86, such as the conventional storage battery of an automobile, to one terminal of the conventional ignition switch 87. A conductor 88 leads from the other terminal of the switch 87 to an intermediate terminal of a double switch 89 having one grounded terminal and lead 90 in which a preferably red telltale lamp 91 is mounted. The conductor 92 of the second terminal of the switch 89 is illustrated as provided with two branch or lateral conductors 93 which are connected to the posts 94 of two electromagnets 68. Thus, the arrangement as illustrated in Figure 5 would be utilized for a two door automobile but it will be readily apparent that four branch conductors 93 could equally well be provided for electrically locking all four doors of a four door automobile and wherein four electromagnets 68 would be utilized. The housing 69 is formed of electrical conducting material and the lever 20 is likewise formed of an electrical conducting material which is non-magnetic, such as aluminum. The lever 19 is formed of a nonmagnetic material which may or may not be an electrical conductor. The pivot pin 17 is formed of electrical conducting material so that a single wire type circuit is utilized with the winding 72 of the electromagnets 68 being grounded to the vehicle frame through the levers 20 and pivot pins 17 to the plate 10, which are likewise formed of electrical conducting material and which are connected electrically to the vehicle frame through the doors, not shown, in which said plates are mounted.

A telltale light 95 which is preferably green is provided for each electromagnet 68 and is wired around the switch 89 by a conductor wire 96 which leads from the conductor 88 and which has branch conductors 96a which connect with the switch contacts 80 and in which the telltale light 95 are interposed.

Assuming that the switch arm 97 of the switch 89 is in engagement with the switch contact of the conductor 90, when the ignition switch 87 is closed the red telltale light 91 will be energized to indicate that the electromagnets 68 are de-energized and in their positions as illustrated in Figures 4 and 6 so that the door locking and latching mechanism as illustrated in Figures 1, 2 and 3 may be operated conventionally, as previously described. The telltale lights 91 and 95 are preferably mounted on the instrument panel of the vehicle readily visible to the driver and the switch 89 is preferably mounted on the instrument panel to the left of the steering post so as to be accessible only to the driver.

To render the electrically operated door lock 67 operative, the vehicle driver merely moves the switch arm 97 into engagement with the contact of the conductor 92 to thereby energize the electromagnets 68 so that the cores 65 will be attracted and drawn from right to left as illustrated in Figures 4 and 6 against the action of the weak springs 76. Each core 65 will move to a position substantially against the outer wall of its housing 69 so that its shank 74 will disengage the opening 75 to thereby disconnect the lever 19 from the lever 20. Also, this movement of the core 65 will cause it to strike the plunger 83 and the plunger 83 will be displaced outwardly to displace the free end of the spring contact 81 into engagement with the contact 80 to thereby ground the branch conductor 96a through the switch 80, 81 to the housing 69, to form a ground in the same manner that the winding 72 is ground, as previously described, for energizing the telltale lamp 95 interposed in said branch conductor 96a. With each of the telltale lights 95 illuminated, the driver will know that the doors are effectively locked against being opened from either the inside or outside. Obviously, movement of the switch arm 97 out of engagement with the contact of the conductor 90 will de-energize the warning light 91. When the electromagnets 68 are energized the levers 19 will be disengaged from the levers 20 so that operation of the levers 20 either by the inside or outside latch actuator will not effect operation of the associated lever 19 and consequently no opening of the door will result. However, the levers 20 may be operated freely and the electromagnets 68 will move therewith and relatively to the levers 19.

It will also be apparent that the electromagnets 68 may be energized for electrically locking the doors with the doors in either open or closed positions and irrespective of whether the door actuating mechanism is in an operative or inoperative position. It will also be obvious that the springs 28 and 40 will cooperate with the upper ends of the slots 26 and 27 to normally maintain the levers 19 and 20 properly positioned so that the core portion 74 will be projected by the spring 76 into the opening 75 of the lever 19 when the electromagnet is de-energized. As seen in Figure 2, the slot 26 of the lever 19 extends downwardly to below the slot 27 of the lever 20 so that said slot 27 will stop movement of the lever 20 in a clockwise direction as seen in Figure 1 before the lever 19 has been moved sufficiently so that any strain can be placed upon the core portion 74. Thus, the core portion 74 will be subjected to very little force or strain, only that sufficient to overcome the tension of the springs 35 and 40, and when the electric lock is operative, the cores 65 will be retracted so that no strain can be placed thereon and the manually actuated unlatching means of the doors may be operated freely, without affecting any operation of the latching mechanism of Figures 1 to 3, except the levers 20.

It will be obvious that the switch 89 may be positioned to close the circuit to the conductor 92 for electrically operating the doors automatically when the ignition switch 87 is closed or the conductor 88 can be connected to a switch closed by placing the vehicle in gear for then automatically locking the doors. A current failure as frequently occurs in case of an accident will automatically unlock the doors.

It will be apparent that the electric lock will prevent a child from opening a vehicle door from either the inside or outside while the lock is energized and will also prevent an intruder from opening the door from either the inside or outside in the event that the vehicle operator is compelled to make a stop for a traffic light or for any other reason.

Various modifications and changes are contemplated and may obviously be resorted to, without departing from the spirit or scope of the invention as hereinafter defined by the appended claims.

I claim as my invention:

1. In combination with a vehicle door locking and latching mechanism including a frame, a latch bolt, an element carrying the latch bolt turnably supported on the frame, spring means urging said element to rotate in one direction for swingably moving the latch bolt to a released position, a detent swingably supported on the frame and spring urged into engagement with said latch bolt carrying element to prevent rotation of said element under the biasing action of said spring means for retaining the latch bolt in a latching position, a first lever swingably supported on the frame and adapted to be swung in one direction to effect release of the detent, and a first spring urging said lever to swing in the opposite direction to an inoperative position; a second lever swingably supported on the frame about an axis common to the axis of swinging movement of the first lever, a bar connected to the second lever and movable into engagement with the detent for swinging the detent to a position out of engagement with the latch bolt carrying element upon swinging movement of the second lever in a direction corresponding to the first mentioned direction of swinging movement of said first lever, a second spring urging the second lever to swing in the opposite direction to an inoperative position for disengaging the bar from the detent, an electrical locking unit comprising a housing supported on a side of the first lever and remote from said second lever, a coupling element slidably mounted in the housing and extending slidably through the first lever, a third spring urging the coupling element into engagement with the second lever for coupling said levers, and an electromagnet disposed in the housing, said coupling element constituting the core of the electromagnet and being retracted when the electromagnet is energized for uncoupling the levers.

2. A structure as in claim 1, said electromagnet being adapted to be connected to an electric circuit of a motor vehicle in which an ignition switch is interposed for automatically energizing the electromagnet by movement of said switch to a closed position.

3. A structure as in claim 2, and a manually operated switch interposed in the circuit of the electromagnet and adapted to be mounted in a position remote from the door locking and latching mechanism for making and breaking the circuit to the electromagnet when said first mentioned switch is in a circuit closing position.

4. A structure as in claim 3, and a secondary circuit including a telltale light connected to said source of electric current around the manually operated switch, said secondary circuit including a switch closed by movement of the electromagnet core to a disengaged position when the electromagnet is energized for visually indicating that the door is electrically locked by retraction of the core out of engagement with said locking and latching mechanism part.

5. A structure as in claim 4, and an auxiliary circuit including a warning light, said auxiliary circuit being closed by movement of the manually actuated switch to a position to de-energize the electromagnet, for de-energizing said telltale light and for closing the auxiliary circuit of the warning light to indicate that the door is not electrically locked.

6. A structure as in claim 1, said levers having openings to receive said coupling element when projected by the third spring, and stop means cooperating with the first and second springs for positioning said openings in alignment when said levers are spring held in inoperative positions.

7. A structure as in claim 6, and stop means limiting movement of said first lever toward a detent releasing position and beyond which position said second lever is freely movable toward a detent releasing position to prevent an undue force being exerted by said first lever on the coupling element when said levers are coupled.

8. A structure as in claim 1, a normally open switch carried by said housing including a movable contact spring urged to a circuit interrupting position, and a plunger slidably supported by said housing and engaged and actuated by movement of the coupling element to a retracted position for actuating said movable contact to close the last mentioned switch for closing a secondary circuit of a visual signal.

References Cited in the file of this patent

UNITED STATES PATENTS

| | | |
|---|---|---|
| 1,635,028 | Burr | July 5, 1927 |
| 1,654,207 | Bergonzoni | Dec. 27, 1927 |
| 1,958,019 | Reasoner | May 8, 1934 |
| 2,031,738 | Schoch | Feb. 25, 1936 |
| 2,427,040 | Billman | Sept. 9, 1947 |
| 2,637,583 | Roethel | May 5, 1953 |
| 2,658,782 | Allen | Nov. 10, 1953 |